United States Patent [19]

Yamagiwa et al.

[11] 4,233,621
[45] Nov. 11, 1980

[54] METHOD AND APPARATUS FOR RECORDING AND REPRODUCING A COLOR-ALIGNED LINE-SEQUENTIAL COLOR VIDEO SIGNAL

[75] Inventors: Kazuo Yamagiwa, Tokyo; Toshihiko Numakura, Kamakura, both of Japan

[73] Assignee: Sony Corporation, Tokyo, Japan

[21] Appl. No.: 960,838

[22] Filed: Nov. 15, 1978

[30] Foreign Application Priority Data

Nov. 21, 1977 [JP] Japan .................. 52-139622

[51] Int. Cl.$^2$ ............................................ H04N 5/79
[52] U.S. Cl. ........................................ 358/8; 358/4
[58] Field of Search .............. 358/4, 8, 12; 360/18, 360/19, 21, 29, 30, 10

[56] References Cited

U.S. PATENT DOCUMENTS

| | | | |
|---|---|---|---|
| 3,852,520 | 12/1974 | Bruch | 358/4 X |
| 3,939,485 | 2/1976 | Amari et al. | 358/4 |
| 4,007,482 | 2/1977 | Amari | 358/4 |
| 4,007,484 | 2/1977 | Amari | 358/8 |
| 4,012,771 | 3/1977 | Ishigaki et al. | 358/4 |
| 4,134,126 | 1/1979 | Hirai | 358/4 |

Primary Examiner—James W. Moffitt
Assistant Examiner—Donald McElheny, Jr.
Attorney, Agent, or Firm—Lewis H. Eslinger; Alvin Sinderbrand

[57] ABSTRACT

A method and apparatus for recording in successive parallel tracks on a record medium a periodic information signal, such as a video signal having information contained in successive line intervals, a predetermined number of line intervals being included in a field interval and a predetermined number of field intervals being included in a frame interval. Alternate ones of the frame intervals are delayed by a time delay equal to an odd multiple $(2n-1)$ of a line interval. The delayed and undelayed frame intervals are supplied, in sequence, to a recording transducer for recording in successive parallel tracks on the record medium. If the video signal is a SECAM color video signal, then the effect of delaying alternate frame intervals, such as the odd (or even) frame intervals is to align line intervals in adjacent tracks with information representing the same color.

Also disclosed are a method and apparatus for reproducing the periodic information signal which had been recorded in the aforementioned manner. These recorded signals are reproduced from the successive parallel tracks to recover the delayed and undelayed frame intervals alternately. The undelayed frame intervals are delayed, during reproduction, by a time delay equal to the aforesaid odd multiple $(2n-1)$ of a line interval, thereby recovering the periodic information signal which appears in successive frame intervals as being undelayed relative to each other. Thus, if, during recording, the odd frame intervals are delayed, then during reproduction, the even frame intervals are delayed so as to equalize the reproduced odd and even frames.

31 Claims, 24 Drawing Figures

METHOD AND APPARATUS FOR RECORDING AND REPRODUCING A COLOR-ALIGNED LINE-SEQUENTIAL COLOR VIDEO SIGNAL

BACKGROUND OF THE INVENTION

This invention relates to a method and apparatus for recording and reproducing periodic information signals, such as composite color video signals, and more particularly, is directed to a method and apparatus for recording and reproducing color video signals wherein information relating to different colors is arranged in line-sequence, and wherein such a line-sequential color information signal is recorded in color alignment.

In a typical video recording system, such as a video tape recorder (VTR) which is capable of recording composite color video signals with high recording density, the color signals are recorded in successive, adjacent record tracks which are provided without guard bands therebetween. In this format, the record medium is utilized efficiently because "blank" portions thereof need not be provided between adjacent record tracks. To minimize crosstalk interference when video signals which are recorded in this format are reproduced, the incoming video signal is processed prior to the recording thereof. Typically, the luminance and chrominance components of the composite color video signal are separated from each other, the luminance component is frequency-modulated to a relatively higher frequency band and the chrominance component is frequency-converted down to a relatively lower frequency band. Then, the processed luminance and chrominance components are combined for recording in successive parallel tracks. Usually, a single field of the video signal is recorded in each track, thereby resulting in the recording of a frame in two successive tracks. In one type of VTR, a pair of magnetic transducers, or recording heads, rotatably scan the magnetic tape, each head being supplied with a single field so as to record that field of video signals in the track which is scanned thereby. In order to reduce crosstalk interference, the air gaps of the two heads are provided with different azimuth angles. Thus, one field, such as the odd field, in each track is recorded with one azimuth angle while the other field is recorded with a different azimuth angle.

During reproduction, the transducers, or playback heads, which are used to reproduce the recorded video signals are provided with the same azimuth angles as were used during recording. Since there are no guard bands to separate adjacent tracks, it is likely that, when one playback head scans its appropriate track to reproduce the video signals recorded therein, it also will pick up a crosstalk component from the adjacent track. However, because of the phenomenon of azimuth loss, since the picked up crosstalk component had been recorded with a different azimuth angle, the picked up crosstalk component will be reproduced with substantial attenuation. Azimuth loss is directly related to the frequency of the recorded signal, so that the reproduced luminance crosstalk component, which had been frequency modulated to a relatively higher frequency band, will be seriously attenuated.

The aforementioned phenomenon of azimuth loss is not as effective in minimizing chrominance crosstalk components. This is because the chrominance components had been frequency-converted down to a relatively lower frequency band during recording. Accordingly, in order to reduce crosstalk interference, adjacent tracks are recorded in so-called H-alignment; that is, the horizontal synchronizing intervals in each track are aligned transversely across the tracks. This H-alignment occurs if the distance that the tape moves during the recording of one field interval is equal to a whole number of lines plus half a line so as to account for the phase at the start of the next field.

Although the foregoing technique generally is used to record color video signals which are present in various formats, such as the NTSC, PAL and SECAM formats, a particular problem may arise if the color video signal is in a line-sequential format, such as the SECAM format. As referred to herein, a line sequential color video signal is of the type wherein successive line intervals are provided with color information signals which relate to different colors. For example, odd line intervals may include blue color information while even line intervals may include red color information. In the SECAM format, this line sequential color information is provided by frequency-modulating a blue subcarrier of about 4.25 MHz with blue color difference signals (B-Y) followed by frequency-modulating a red subcarrier of about 4.41 MHz with red color difference signals (R-Y). Thus, the blue and red color information signals appear alternately. Furthermore, since the SECAM color video signal is provided with 625 line intervals in each frame, the color information which is recorded in the first line interval also is recorded in the last line interval of that frame. This means that, in odd frames, the blue color information may be provided in odd line intervals while the red color information may be provided in the even line intervals, while in the even frames, the blue color information may be provided in the even line intervals while the red color information may be provided in the odd line intervals. Of course, the converse of this also may occur.

Figure 1:
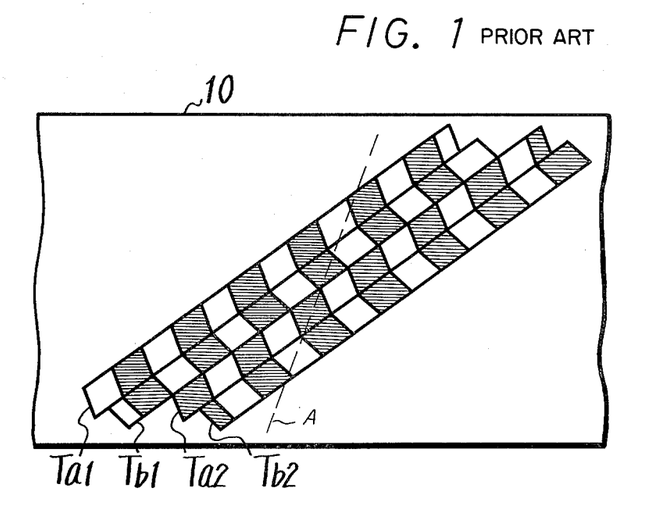
FIG. 1 is a schematic representation of a typical prior art technique for recording line-sequential color video signals on a record medium.

When a SECAM color video signal of the aforementioned type is recorded in accordance with the technique discussed above, then, because the first field of one frame generally is shifted by 1.5H (H is the length or delay of a horizontal line interval) from the start of the last field of a preceding frame, successive frames are recorded in the absence of color alignment. That is, in one frame, constituted by two tracks each containing a single field, adjacent line intervals are provided with information relating to the same color. Hence, blue color information is aligned transversely of the record tracks, followed by aligned red color information, aligned blue color information, and so on. However, when the next frame is recorded, the blue color information which is present in the preceding frame is aligned with the red color information in the next following frame. A representation of this type of recording is illustrated in FIG. 1 of the accompanying drawings wherein the subscript 1 represents frame 1, or odd frames, and subscript 2 represents frame 2, or even frames. Furthermore, subscript a represents the first field in each frame while subscript b represents the second field in each frame. In FIG. 1, those line intervals which contain blue color information are illustrated without cross-hatching, and those line intervals which contain red color information are illustrated with cross-hatching.

From FIG. 1, it is seen that, in a frame, the beginning of the first field in that frame is displaced from the beginning of the following field by a distance equal to one-half a horizontal line interval, this displacement being in the direction of the track. Thus, the beginning of the track $T_{a1}$ in which the first field is recorded is displaced from the beginning of track $T_{b1}$ in which the following field is recorded by 0.5H. Also, the beginning of the first field in one frame is displaced from the beginning of the second field in the immediately preceding frame by one and one-half horizontal line intervals. That is, the beginning of track $T_{a2}$ in which the first field of, for example, the second frame is recorded, is displaced from the beginning of track $T_{b1}$ in which the second field of the first frame is recorded by 1.5H. Furthermore, in one frame, such as the frame recorded in tracks $T_{a1}$ and $T_{b1}$, the horizontal line intervals in these respective tracks are in color-alignment with each other. That is, red color information signals are recorded in adjacent line intervals, and blue color information signals are recorded in adjacent line intervals. However, although tracks $T_{a1}$ and $T_{b1}$ are recorded in color-alignment, and tracks $T_{a2}$ and $T_{b2}$ are recorded in color alignment, track $T_{b1}$ is not in color-alignment with tracks $T_{a2}$. That is, although the first and second fields of a given frame are recorded in color-alignment, adjacent frames are not recorded in such color-alignment.

The SECAM color video signal is formed of 625 line intervals. Each frame is constituted by 312.5 line intervals. For proper alignment of the horizontal synchronizing intervals, track $T_{b1}$ is displaced by 0.5H from track $T_{a1}$. If it is assumed that two rotary transducers are used to record the successive tracks, and if it is further assumed that these two heads, referred to for the purpose of the present discussion as heads A and B, are separated from each other by 180°, and if the tape is transported a distance equal to 1H for each pass of a head thereacross, then successive tracks will be displaced by an amount equal to 1H. In order to record the tracks in the format shown in FIG. 1, heads A and B must be separated from each other by an angle of $180° - \alpha$. The angle $\alpha$ is such that the tape is transported by 0.5H from the time that head A scans the tape until head B reaches the tape; and the tape is transported by an amount equal to 1.5H from the time that head B scans the tape until head A reaches the tape.

When the SECAM color video signal is recorded in the format shown in FIG. 1, that is, wherein information relating to a particular color is recorded in odd line intervals in odd-numbered frames and in even line intervals in even-numbered frames, there is no difficulty in reproducing the original video signal during a normal playback operation. This is because the respective playback heads scan the same tracks during a reproducing operation as were scanned by such heads (or the equivalent thereof) during recording. That is, the scanning traces of the heads during a reproducing operation are substantially coincident with the scanning traces of the heads during a recording operation. However, there is a problem when the recorded SECAM color video signal is reproduced during a slow-motion or still-motion mode. In such modes, the speed at which the tape is transported is less than the normal recording/reproducing tape speed. As a consequence thereof, the playback heads do not scan the same traces during a slow-motion or still-motion reproducing operation as were scanned during a normal recording operation. As an example of the scanning trace of each playback head during such slow-motion or still-motion reproducing operations, reference is made to FIG. 1 wherein the trace of the playback head is illustrated by the broken line A. It is seen that this scanning trace crosses over a number of tracks. Furthermore, since the SECAM color video signal is not recorded in color alignment from one frame to the next, scanning trace A does not cross over alternate color information signals. Rather, when this scanning trace traverses adjacent tracks which are associated with different frames, for example, tracks $T_{a2}$ and $T_{b1}$, color signals relating to the same color are reproduced in successive line intervals. More particularly, as scanning trace A traverses tracks $T_{b2}$, $T_{a2}$, $T_{b1}$ and $T_{a1}$, in sequence, the color difference signals which are reproduced by the playback head are seen to be (B-Y), (R-Y), (R-Y) and (B-Y), respectively.

As a result of the scanning of two successive line intervals having color information signals therein relating to the same color, the line-sequential format of the SECAM video signal is disturbed. Consequently, if the video signals which are reproduced during the slow-motion or still-motion mode are supplied to a television monitor, the displayed video signal will exhibit substantial color noise, or interference. This is because, since the line-sequential arrangement is distorted, a (B-Y) color difference signal will be misinterpreted as a (R-Y) color difference signal in some line intervals and will be supplied to the red color demodulator. Similarly, in other line intervals, the reproduced (R-Y) color difference signal will be misinterpreted as the (B-Y) color difference signal and will be supplied to the blue color demodulator. Consequently, the respective color demodulators will not be capable of demodulating the particular color difference signals which are supplied thereto. Since color discrimination cannot be attained properly, the usual color killer circuit which is provided to avoid erroneous display of a color picture will be operated. Although the usual color discriminating signals are provided in each vertical blanking interval of the recorded SECAM color video signal, these discriminating signals, when reproduced, will establish a particular switching condition for switching the reproduced line intervals alternately to different ones of the color demodulators. But since the reproduced color information signals do not alternate properly, incorrect color difference signals will be supplied to the respective red and blue color demodulators. Consequently, the aforenoted problem of displayed color noise or of color killer operation is present.

In order to avoid this mis-operation of the color demodulators in a SECAM television receiver, the color information signals in all frames should be recorded in color-alignment. That is, in addition to the normal color-alignment of both fields in a given frame, there also should be color-alignment between frames. A type of color alignment is described in U.S. Pat. No. 3,852,520. However, as described therein, a given color information signal is recorded in, for example, odd line intervals in both odd and even frames. This means that if, for example, the (R-Y) color difference signal is recorded in the last, or 625th, line interval of one frame, it also is recorded in the first line interval of the next following frame. However, in a conventional SECAM color video signal, if the (R-Y) color difference signal is provided in the 625th line interval of one frame, then the (B-Y) color difference signal should be provided in the first line interval of the next-following frame. Consistent with this normal convention, a typical SECAM television receiver is adapted to respond to the first line interval of the next following frame as containing color information which is different from the last line interval of the immediately preceding frame. But, since the same color information signal is recorded in the last and first line intervals of all frames, in accordance with the technique described in U.S. Pat. No. 3,852,520, the video signals which are reproduced are not in proper line-sequence from one frame to the next. Thus, the aforementioned difficulty in color noise and color killer operation will be present when the technique described in this patent is used for the recording and reproducing of SECAM color video signals in color-alignment.

OBJECTS OF THE INVENTION

Therefore, it is an object of the present invention to provide an improved method and apparatus for recording and reproducing video signals, particularly SECAM color video signals, which avoid the aforenoted difficulties.

Another object of this invention is to provide a method and apparatus for recording SECAM color video signals in successive parallel tracks in color-alignment for all tracks.

A further object of this invention is to provide an improved method and apparatus for reproducing SECAM color video signals which are recorded in parallel tracks in color-alignment for all tracks.

An additional object of this invention is to provide an improved method and apparatus for recording and reproducing SECAM color video signals in parallel record tracks in color-alignment wherein, during reproduction, a proper line sequence of color information signals is obtained from one frame to the next.

Various other objects, advantages and features of the present invention will be become readily apparent from the ensuing detailed description, and the novel features will be particularly pointed out in the appended claims.

SUMMARY OF THE INVENTION

In accordance with this invention, a method and apparatus for recording a periodic information signal, such as a video signal, in successive parallel tracks on a record medium are provided. In a preferred use of this invention, the periodic information signal is a SECAM color video signal. Alternate ones of the frame intervals of the video signal are delayed by a time delay equal to an odd multiple $(2n-1)$ of a line interval. The delayed and undelayed frame intervals are supplied to a recording transducer for recording in successive parallel tracks on the record medium.

In accordance with another aspect of this invention, a method and apparatus for reproducing the aforementioned recorded signals also are provided. In reproducing such signals, the delayed and undelayed frame intervals are reproduced alternately, and the reproduced undelayed frame intervals are subjected to a time delay which is equal to the time delay used during recording.

Thus, in accordance with this invention, video signals are recorded in successive frames in color-alignment by delaying, for example, each odd-numbered frame by one line interval during recording. The proper line-sequence of color information signals is recovered during reproducing by delaying only the even-numbered frames. Hence, there is no delay between the reproduced odd-numbered and even-numbered frames.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

For convenience in describing the various aspects of the present invention, it is assumed that the signals which are recorded and reproduced are color video signals. This invention finds ready application with the SECAM color video signal which is comprised of alternate line intervals formed of red and blue subcarriers which are frequency-modulated with red and blue color difference signals, respectively. In one frame, for example, all of the odd line intervals may be constituted by red color information, and all even line intervals may be constituted by blue color information. Then, in the next frame interval, all odd line intervals are constituted by blue color information and all even line intervals are constituted by red color information. It will, of course, be appreciated that the apparatus which is disclosed herein can be readily adapted to record and reproduce other types of periodic information signals other than color video signals, and other than SECAM color video signals. Such other periodic information signals, nevertheless, should be formed of periodic sub-intervals, corresponding to the horizontal line intervals of a video signal, a predetermined number of such sub-intervals constituting a field interval, or its equivalent, and a predetermined number of field intervals constituting a frame interval, or its equivalent. In this type of periodic information signal, the alternate line intervals may contain multiplexed information such that, in one frame, information relating to one characteristic, or to one source, may be provided in the odd line intervals while information relating to another characteristic or to another source may be provided in the even line intervals. This is analogous to the alternating red and blue color information contained in alternating line intervals in the SECAM color video signal.

Turning now to the drawings, FIG. 1 has been described hereinabove. It is recalled that this figure represents the parallel tracks which are recorded on a record medium 10, such as a magnetic tape, each track containing a field interval, and two adjacent tracks comprising a frame interval. Thus, tracks $T_{a1}$ and $T_{b1}$ constitute the first and second fields of a first frame; and tracks $T_{a2}$ and $T_{b2}$ constitute the first and second fields in the next adjacent frame. In accordance with standard recording techniques, the starting edge of the first field in the second frame, that is, track $T_{a2}$, is displaced from the starting edge of the second field in the preceding frame, that is, track $T_{b1}$, by a distance corresponding to 1.5 horizontal line intervals (1.5H). However, the adjacent tracks which constitute a single frame are displaced from each other by 0.5H. Thus, tracks $T_{a1}$ and $T_{b1}$ are displaced from each other by 0.5H, as are tracks $T_{a2}$ and $T_{b2}$. The cross-hatched areas in FIG. 1 represent those line intervals in which the red color difference signals are recorded, and the unhatched areas represent those line intervals in which the blue color difference signals are recorded. As mentioned above, during a slow-motion or still-motion mode of reproduction, the reproducing transducer, or playback head, scans across the respective tracks along scanning trace A. It is seen that when the playback head follows scanning trace A, it traverses two successive line intervals containing information signals relating to the same color. Specifically, as the head traverses one track in which the first field of a frame interval is recorded and then traverses the next adjacent track in which the second field interval of the preceding frame is recorded, information signals relating to the same color are reproduced in sequential line intervals. This disrupts the normal alternate color information which is reproduced from sequential lines in a SECAM color video signal. Thus, when the tracks shown in FIG. 1 are scanned for slow-motion or still-motion reproduction, the color difference signals which are reproduced appear as (B-Y), (R-Y), (R-Y), (B-Y), (B-Y), and so on, rather than the proper sequence of (B-Y), (R-Y), (B-Y), (R-Y), and so on.

Figure 2:
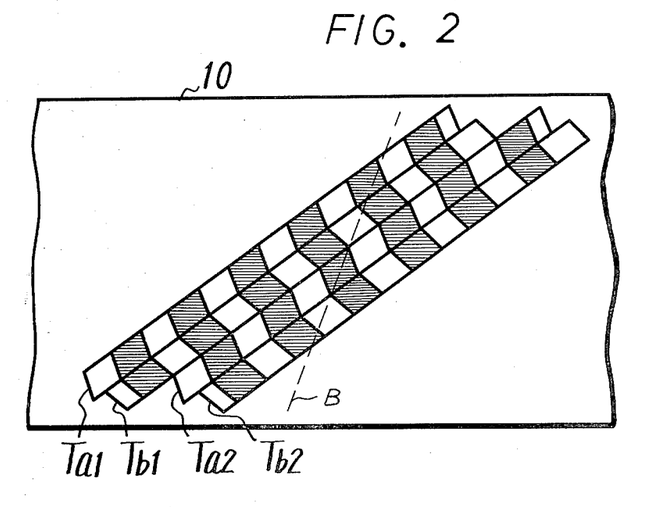
FIG. 2 is a schematic representation of line-sequential color video signals which are recorded on a record medium in accordance with the present invention.

The purpose of the present invention is to shift, or displace, the relative positions of the line intervals which are included in alternate frames, such as the even frames, recorded in parallel tracks $T_a$ and $T_b$. More particularly, by this invention, the line intervals which are recorded in tracks $T_{a2}$ and $T_{b2}$ are shifted, relative to the line intervals recorded in tracks $T_{a1}$ and $T_{b1}$, such that all of the line intervals are in coloralignment, as shown in FIG. 2. Thus, while the first line interval recorded in track $T_{a1}$ and the last line interval recorded in track $T_{b1}$ contain color information relating to the same color, the first line interval recorded in track $T_{a2}$ and the last line interval recorded in track $T_{b2}$ likewise include color information signals relating to that very same color. As will be explained below, this format is attained by delaying the chrominance component of the SECAM color video signal in alternate frame intervals by one horizontal line interval. With this delay, the first line interval which is recorded in track $T_{a2}$, the track in which the first field of the delayed frame is recorded, is the same line interval as was recorded as the last line interval in immediately preceding track $T_{b1}$. Since only alternate frame intervals are delayed, the first and last line intervals in each track for all of the recorded frames contain color information signals relating to the same color, resulting in color-alignment.

When the recorded signals on record medium 10 are reproduced in a slow-motion or still-motion mode, the trace of the playback heads across the surface of the record medium appears as shown by the broken line B. Since the recorded tracks are in color-alignment, the playback head scans alternating color information signals as it proceeds across trace B. Thus, and as shown, in the slow-motion and still-motion modes, the color information signals which are reproduced appears as (B-Y) (R-Y) (B-Y) (R-Y), and so on. Consequently, by reason of this color-alignment which is achieved by the present invention, the proper line-sequence of alternating color information signals are reproduced even during slow-motion and still-motion operation. A SECAM television monitor responds properly to this reproduced color information; and the video picture which is displayed on this monitor is substantially free of color noise. Moreover, the color killer operation will not be carried out erroneously.

Figure 3:
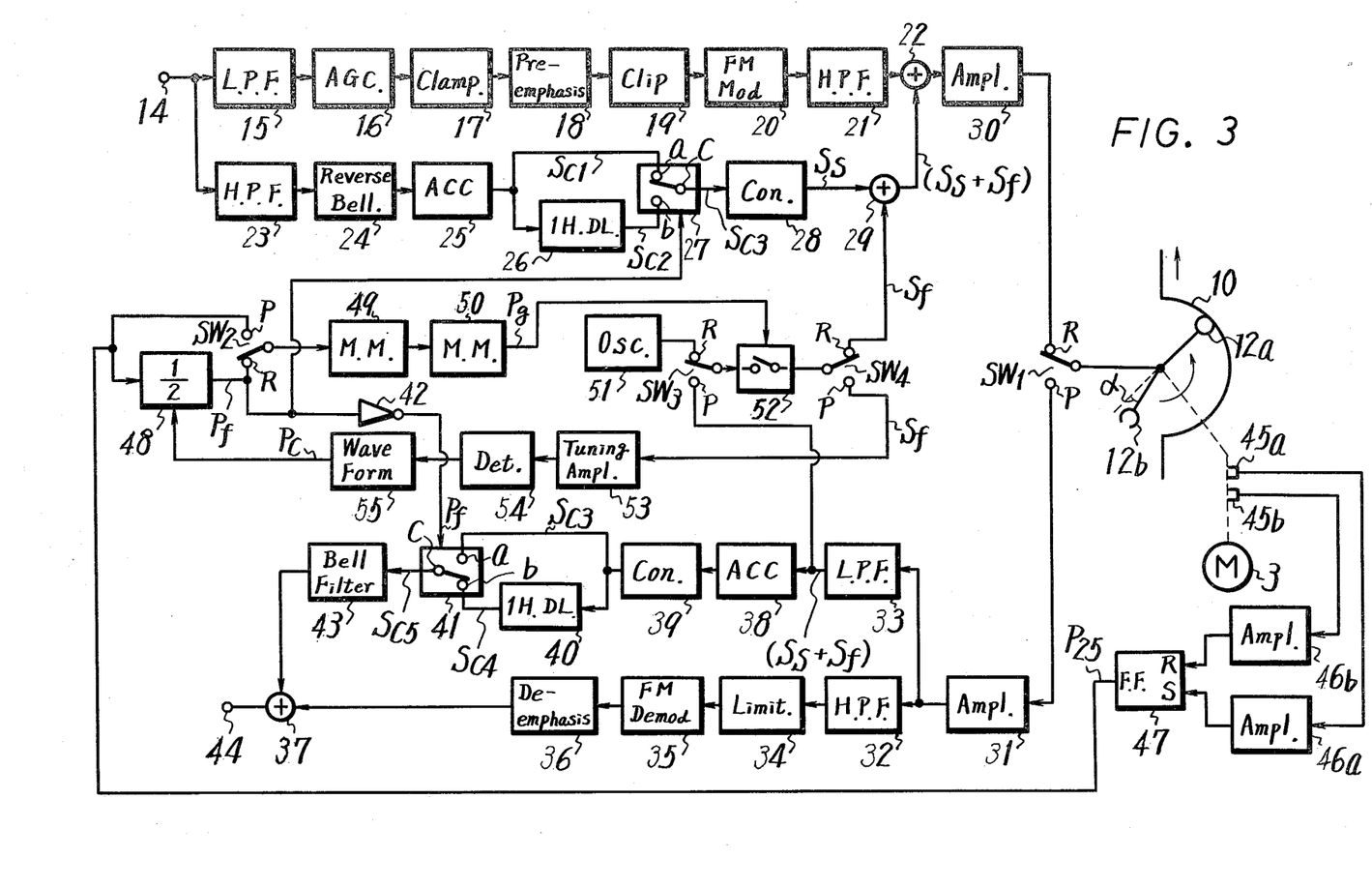
FIG. 3 is a block diagram of a preferred embodiment of the present invention.

Turning now to FIG. 3, there is illustrated apparatus including a recording section and a reproducing section, in accordnce with one embodiment of the present invention. To facilitate a ready understanding of this invention, it is assumed that the record medium upon which the signals are recorded in successive parallel tracks is a magnetic tape. Furthermore, it is assumed that the signals are color video signals and, specifically, they are SECAM color video signals wherein color information signals relating to different colors are present alternately in sequential line intervals. Of course, and as will be apparent, other periodic information signals can be recorded on the magnetic tape, such periodic information signals being constituted by a predetermined number of sub-intervals included in a field interval, and a predetermined number of field intervals included in a frame interval.

The video signals are recorded on magnetic tape 10 by a pair of rotary transducers, or record heads 12a and 12b. These record heads are rotatably driven by a drive shaft mechanically coupled to a drive motor 13. Tape 10 is deployed about at least 180° of the periphery of a guide drum and is longitudinally transported by conventional tape-drive apparatus, such as the combination of a capstan and a pinch roller. Motor 13, which is driven by a servo-control circuit (not shown), rotates record heads 12a and 12b at the frame repetition rate of the SECAM color video signal, e.g. 25 rotations per second. As each frame includes two field intervals, each of record heads 12a and 12b functions to record a field in a respective track across tape 10.

The recording section of the illustrated apparatus includes a luminance channel, for separating and processing the luminance component included in the color video signal, and a chrominance channel for separating and processing the chrominance component included in the video signal. The luminance channel is comprised of a low pass filter 15, a gain-controlled amplifier 16, a clamp circuit 17, a pre-emphasis circuit 18, a dark-and-white clipper 19, and a frequency modulator 20. The luminance channel is connected to an input terminal 14 for receiving the composite color video signal. Low pass filter 15 is connected to this input terminal for separating the luminance component, which is contained in a relatively lower frequency band, from the chrominance component. The output of low pass filter 15 is connected to gain-controlled amplifier 16, which comprise an automatic gain control (AGC) amplifier. AGC amplifier 16 is connected to clamp circuit 17, the latter serving to compensate for level changes in the luminance component by clamping the DC level thereof to a reference level, such as the pedestal level.

The output of clamp circuit 17 is supplied through pre-emphasis circuit 18, which may be a conventional pre-emphasis circuit, to dark-and-white clipper 19. This clipper serves to prevent the dark and white levels of the luminance component from exceeding predetermined values. The luminance component provided at the output of clipper 19, which is a properly compensated and prepared luminance component, is supplied to frequency modulator 20 wherein the luminance component frequency-modulates a carrier of relatively higher frequency, resulting in a frequency-modulated (FM) luminance component. This higher frequency FM luminance component is supplied through a high pass filter 21 to a combining circuit 22, shown herein as a summing circuit. This combining circuit is adapted to combine the chrominance component processed by the chrominance channel with the FM luminance component, and then to supply the combined signal through a recording amplifier 30 and the record contact R of a change-over switch $SW_1$ to heads 12a and 12b.

Preferably, in order to exploit the aforementioned phenomenon of azimuth loss for eliminating cross-talk interference due to the higher frequency luminance component which may be picked up from an adjacent record track during the reproducing operation, heads 12a and 12b are provided with air gaps of different azimuth angles. Hence, if the higher frequency FM luminance component which is recorded in a record track by head 12a is, subsequently, reproduced by head 12b, this reproduced FM luminance component will be substantially attenuated because of azimuth loss.

The chrominance channel included in the recording section of the illustrated apparatus includes a high pass filter 23, a reverse bell filter 24, an automatic chrominance control (ACC) circuit 25, a selective delay circuit comprised of a delay circuit 26 and a change-over switch 27, and a frequency converter 28. High pass filter 23 is connected to input terminal 14 to receive the composite color video signal and to separate the chrominance component, which is included in a relatively higher frequency band, from the luminance component. The output of this high pass filter is connected to reverse bell filter 24, the latter having a frequency characteristic which resembles the inverse of a bell-shaped curve. Hence, reverse-bell filter 24 serves, in part, to provide some frequency compensation to the filtered chrominance component, resulting in a chrominance component exhibiting a relatively flat frequency characteristic. The output of the reverse bell filter is supplied through ACC circuit 25 to the selective delay circuit. The ACC circuit is adapted to control the level of the filtered chrominance component so as to eliminate undesired amplitude fluctuations therein. As an example, ACC circuit 33 may include a gate circuit operative to transmit a discriminating signal which is present during the back porch portion of each horizontal synchronizing signal, and which is constituted by an unmodulated chrominance subcarrier which is equal to the subcarrier that is frequency-modulated in the remainder of the line interval. The amplitude of this transmitted discriminating signal is detected and used to adjust the amplitude of the chrominance component accordingly. As an alternative, since the chrominance component is comprised of frequency-modulated blue and red subcarriers, and since color information is not represented by amplitude fluctuations, such amplitude fluctuations can be removed by ACC circuit 33 if this ACC circuit is a limiter.

The output of ACC circuit 25 is supplied through the selective delay circuit to frequency converter 28. In this selective delay circuit, delay circuit 26 is adapted to impart a delay equal to one horizontal line interval (referred to herein as a 1H delay) to the signals which are supplied thereto. As shown, the output of ACC circuit 25 is connected to the input of 1H delay circuit 26. Change-over switch 27, sometimes referred to herein as a switching circuit, is provided with fixed input contacts a and b, and a movable output contact c selectively controlled so as to engage either of its input contacts. A switch control circuit, described below, supplies a switch control signal to the control input of change-over switch 27, this switch control signal being determinative of the particular input contact to which the output contact is connected. As shown, input contact a is connected directly to the output of ACC circuit 25 so as to receive an undelayed signal therefrom; and input contact b is connected to the output of 1H delay circuit 26 so as to receive a delayed signal. Output contact c is connected to frequency converter 28.

The frequency converter is adapted to frequency-convert the chrominance components supplied thereto to a frequency band which is substantially below the frequency band of the FM luminance component produced by frequency modulator 20. In this regard, frequency divider 28 may include a modulating or heterodyning circuit which is supplied with the chrominance component from change-over switch 27 and a frequency-converting signal from a suitable source. These respective signals are heterodyned, and preferably, the lower sideband, or difference frequency, is derived from the output of the frequency converter. Such frequency converters are known to the prior art. In another embodiment, frequency converter 28 may be of the type described in copending application Ser. No. 960,839, filed Nov. 15, 1978. In either embodiment, the output of frequency converter 28 is supplied through a summing circuit 29 to combining circuit 22 whereat the frequency-converted chrominance component and FM luminance component are combined into a composite signal. This composite signal is supplied through recording amplifier 30 and through change-over switch $SW_1$ to record heads 12a and 12b.

The switch control circuit which determines the operating condition, or state, of change-over switch 27 is comprised of a flip-flop circuit 47, a frequency divider 48 and a change-over switch $SW_2$. Flip-flop circuit 47 is of the so-called RS type including a set input S and a reset input R. The state of flip-flop circuit 47 is determined by the signals which are supplied to the set and reset inputs thereof, respectively. More particularly, this flip-flop circuit is set in response to a binary "1" applied to its S input and is reset in response to a binary "1" applied to its R input. Flip-flop circuit 47 is included in a sensing circuit which is adapted to sense the rotary positions of heads 12a and 12b. In this regard, the drive shaft which extends from motor 13 and is used to rotatably drive heads 12a and 12b is provided with magnetic elements spaced thereon. These magnetic elements rotate with the drive shaft and are detected by fixedly disposed magnetic detectors 45a and 45b. One magnetic element is particularly disposed so as to be detected by magnetic detector 45a when head 12a rotates into position so as to commence scanning a record track across tape 10. The other magnetic element is particularly disposed on the drive shaft so as to be detected by magnetic detector 45b when head 12b rotates into position to commence scanning a record track across the tape. Magnetic detectors 45a and 45b are adapted to produce detecting pulses when the respective magnetic elements are detected thereby, these detecting pulses being supplied to the S and R inputs of flip-flop circuit 47 by amplifiers 46a and 46b, respectively.

The output of flip-flop circuit 47, which may comprise a rectangular pulse signal representing the state of the flip-flop circuit, is coupled through frequency divider 48 to the control input of change-over switch 47. Frequency divider 48 may comprise a conventional frequency-dividing circuit, such as a triggerable flip-flop circuit, adapted to divide the frequency of the rectangular pulse signal supplied thereto from flip-flop circuit 47 by a factor of 2. The output of frequency divider 48 also is coupled to the record contact R of change-over switch SW$_2$ to a monostable multivibrator 49, the output of which being coupled to another monostable multivibrator 15.

Monostable multivibrators 49 and 50 are adapted to respond to the output of frequency divider 48 for producing a gate pulse P$_g$ of predetermined duration at a predetermined time. This gate pulse is used during the recording operation to control the insertion of a discriminating signal into the frequency-converted chrominance component. As will be described below, the presence of this discriminating signal is used as an indication of the particular frames of video signals which are shifted in the recording thereof, as shown in FIG. 2. The circuit for producing and inserting this discriminating signal is comprised of a reference oscillator 51, a switching circuit 52, such as a gating circuit, and change-over switches SW$_3$ and SW$_4$. Reference oscillator 51 is adapted to produce an oscillating signal of substantially constant frequency. This oscillating signal is used as the discriminating signal and is supplied to switching circuit 52 via the record contact R of change-over switch SW$_3$. A control signal, that is, the gating signal P$_g$, is applied to switching circuit 52 by monostable multivibrator 50. The output of this switching circuit is coupled via the record contact R of change-over switch SW$_4$ to summing circuit 29 whereat the discriminating signal is combined with, or inserted into, the frequency-converted chrominance component. The output of summing circuit 29 is connected to combining circuit 22.

The manner in which the recording section illustrated in FIG. 3 operates now will be described with reference to the waveform diagrams of FIGS. 4A–4D and 5A–5E. The luminance component is processed to an FM luminance component by a luminance channel in a manner which is known to those of ordinary skill in the art. Hence, in the interest of simplification, further description of this known operation is not provided herein.

Figure 4A:
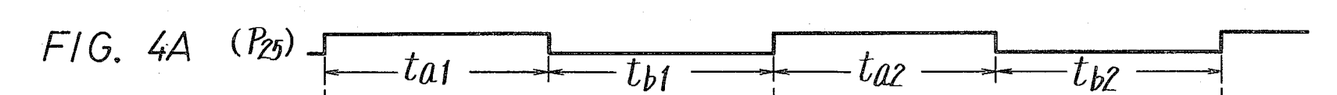
FIGS. 4A–4D are waveform diagrams which are useful in understanding the recording operation which is carried out by the apparatus shown in FIG. 3.
Figures 4B, 4C, 4D:
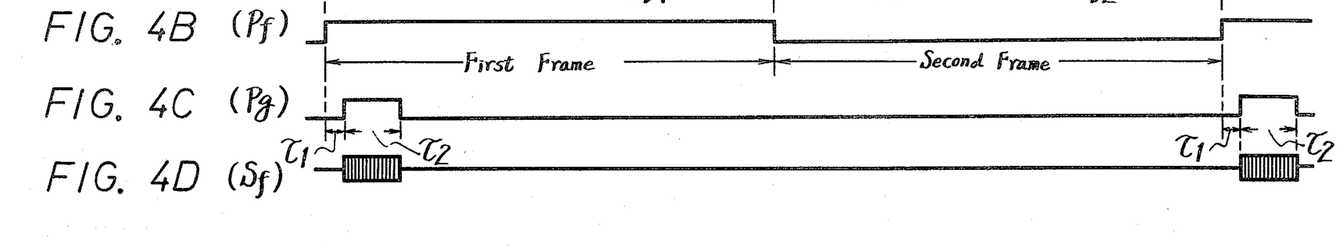

As motor 13 rotatably drives heads 12a and 12b, magnetic detectors 45a and 45b produce detecting pulses when the respective magnetic elements which are disposed on the drive shaft rotate therepast. It is appreciated that each magnetic detector produces detecting pulses at a rate corresponding to the frame rate, that is, the rate at which each head is rotated. Thus, flip-flop circuit 47 is set when head 12a scans tape 10 to record a field of video signals, and this flip-flop circuit is reset when head 12b scans the tape to record the next field of video signals. This operation of flip-flop circuit 47 results in the rectangular pulse signal P$_{25}$ produced thereby, as shown in FIG. 4A. Thus, the flip-flop circuit is set for the duration of field interval $t_{a1}$ in the first frame, then is reset for the duration of field interval $t_{b1}$ in the first frame, then is set for the duration of field interval $t_{a2}$ in the second frame, then is reset for the duration of field interval $t_{b2}$ in the second frame, and so on. The frequency of the rectangular pulse signal P$_{25}$ is divided by frequency divider 48, resulting in the divided rectangular pulse signal P$_f$, shown in FIG. 4. It is appreciated that this divided pulse signal is at its relatively higher binary "1" level for the duration of one frame and then is at its relatively lower binary "0" level for the duration of the immediately following frame. For convenience in describing the operation of the illustrated apparatus, it is assumed that the frequency-divided pulse signal P$_f$, which is seen to be the switch control signal, is a binary "1" for odd frames and is a binary "0" for even frames. Of course, if desired, this relationship can be reversed wherein the switch control signal is a binary "1" for even frames and is a binary "0" for odd frames.

Switching circuit 27 is operated such that output contact c engages input contact a when the switch control signal applied thereto is a binary "1". When the state of the switch control signal reverses to a binary "0", switching circuit 27 is operated so as to connect output contact c to input contact b. Thus, for each odd frame, the undelayed frame of the chrominance component provided at the output of ACC circuit 25 is coupled via switching circuit 27 to frequency converter 28. However, for each even frame, the delayed chrominance component provided at the output of 1H delay circuit 26 is supplied to frequency converter 28 by switching circuit 27. This means that each even frame interval is delayed by one horizontal line interval. The frequency converter supplies the frequency-converted chrominance component, having alternating delayed and undelayed frames, to combining circuit 22 via summing circuit 29, for combining with the FM luminance component, and for recording in successive parallel tracks on tape 10 by heads 12a and 12b. It is appreciated that, by delaying alternate frames of the chrominance component by one horizontal line interval, successive frames are recorded in the format shown in FIG. 2, whereby all of the record tracks are disposed in color-alignment.

Monostable multivibrator 49 is responsive to the positive transition in switch control signal P$_f$ (FIG. 4B) to produce a timing pulse of predetermined duration $\tau_1$. At the negative transition of this timing pulse, monostable multivibrator 50 is triggered to produce gating pulse P$_g$ having the predetermined duration $\tau_2$, as shown in FIG. 4C. Hence, this gating pulse is provided at a repetition frequency equal to one-half the frame repetition rate. Stated otherwise, gating pulse P$_g$ is provided at a predetermined location in each odd frame. This gating pulse is supplied to gate circuit 52 for opening this gate so as to couple the discriminating signal produced by oscillator 51 through change-over switch SW$_4$. FIG. 4D represents this discriminating signal S$_f$ which is applied to summing circuit 29 whereat it is inserted into the frequency-converted chrominance component S$_s$. The combined frequency-converted chrominance component and inserted discriminating signal (S$_s$+S$_f$) is combined with the FM luminance component in combining circuit 22, the resultant composite video signal being recorded in successive tracks by heads 12a and 12b. It is recognized that the discriminating signal S$_f$ is inserted only for predetermined durations at predetermined locations of the frequency-converted chrominance component S$_s$.

Figure 5A:
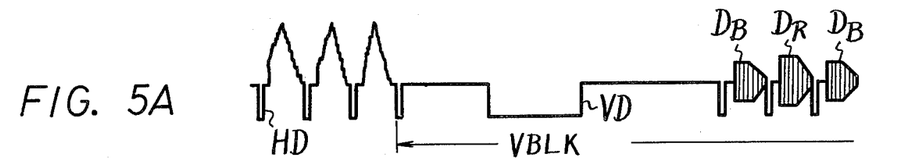
FIGS. 5A–5E are waveform diagrams which are of additional use in explaining the operation of the recording operation of the apparatus shown in FIG. 3.

The location of the chrominance component in which discriminating signal S$_f$ is inserted now will be described with reference to the waveform diagrams of FIGS. 5A–5E. Let it be assumed that a portion of the incoming video signal, including the vertical synchronizing interval, appears as shown in FIG. 5A, wherein each horizontal line interval is defined by the periodic horizontal synchronizing pulses HD, and wherein the video information signals, including both the luminance and chrominance components, are represented as amplitude-varying signals between successive horizontal synchronizing pulses. The vertical blanking interval is represented as VBLK, and the vertical synchronizing pulse is represented as VD. As is conventional, a plurality of equalizing pulses are provided before and after the vertical synchronizing pulse interval, and a plurality of vertical synchronizing pulses are present during the vertical synchronizing pulse interval. Furthermore, and in accordance with the SECAM convention, line discriminating signals are provided in successive line intervals following the equalizing pulses in the vertical blanking interval VBLK. These line discriminating signals are formed of unmodulated blue and red subcarriers which are present in alternate line intervals. Thus, if the blue line discriminating signal is represented as DB and the red line discriminating signal is represented as DR, then the line discriminating signals are present in the sequence DB, DR, DB, DR, etc., for a given number of line intervals during the vertical blanking interval for odd-numbered frames; and these line discriminating signals are present in the sequence DR, DB, DR, DB, etc. for the given (e.g. 9) number of line intervals for the even-numbered frames. The purpose of these line discriminating signals is to condition switching circuitry included in a conventional SECAM television receiver to supply the chrominance components which are received during successive line intervals to the proper demodulators.

Figure 5B:
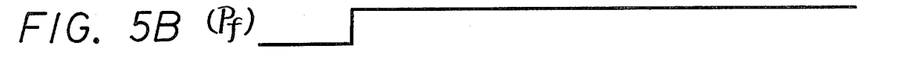
Figure 5C:
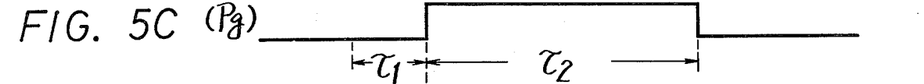
Figure 5D:
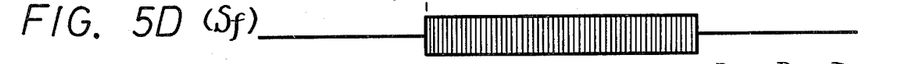

The switch control signal $P_f$, produced by frequency divider 48, and discussed previously with respect to FIG. 4B, is illustrated in FIG. 5B relative to the vertical blanking interval provided at the beginning (or end) of each frame. It is recalled that the generation of this switch control pulse $P_f$ is dependent upon the detection of the magnetic elements provided on the drive shaft for record heads 12a and 12b by magnetic detectors 45a and 45b. Thus, the commencement of switch control pulse $P_f$ is dependent upon the particular positioning of these magnetic elements. FIG. 5C represents the gate pulse $P_g$ which is produced for a duration $\tau_2$ at a delayed time $\tau_1$ following the beginning of the switch control signal $P_f$. FIG. 5D represents the output of gate circuit 52, wherein the discriminating signal $S_f$ is provided during the duration of the gate pulse $P_g$. These signals have, of course, been described previously with respect to FIGS. 4C and 4D, respectively.

Figure 5E:
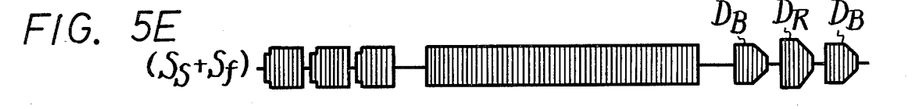

FIG. 5E represents the combination of the frequency-converted chrominance component and the inserted discriminating signal $(S_s+S_f)$ which is combined with the FM luminance component in combining circuit 22. The line intervals which precede the inserted discriminating signal $S_f$ are seen to contain the frequency-converted chrominance component, these chrominance components being constituted by alternate blue and red frequency-converted subcarriers which are frequency-modulated with the blue and red difference signals, respectively. Following the inserted discriminating signal $S_f$ are the alternating line discriminating signals DB, DR, DB, DR, etc., as shown. Preferably, the inserted discriminating signal $S_f$ should be present for a duration which is as long as possible, but does not interfere with or overlap any of the line discriminating signals DB, DR. Thus, the time constant of monostable multivibrator 50 should be selected accordingly.

In a numerical example, the average frequency of the frequency-converted blue and red subcarriers is about 680 KHz. The frequency of the oscillating signal produced by reference oscillator 51 is about twice this average frequency, or about 1.3 MHz. Hence, the frequency of the discriminating signal is at the upper limit, yet is within the frequency band of the frequency-converted chrominance component $S_s$ and, therefore, is below the frequency band of the FM luminance component.

In view of the foregoing discussion of the illustrated apparatus, it is appreciated that record head 12a is adapted to record the first field, for example, in each frame and record head 12b is adapted to record the second field in each frame. Thus, field $t_{a1}$ is recorded by head 12a in track $T_{a1}$, and field $t_{b1}$ is recorded by head 12b in track $T_{b1}$. Then, in the next frame, field $t_{a2}$ is recorded by head 12a in track $T_{a2}$, and field $t_{b2}$ is recorded in track $T_{b2}$ by head 12b. Alternate ones of the frames are delayed by one horizontal line interval. In the embodiment discussed herein, the chrominance component in the even-numbered frames, which are present when switch control signal $P_f$ is a binary "0", are delayed by one horizontal line interval, are frequency-converted and then are recorded. The chrominance component included in the odd-numbered frames, that is, those frames which are present when switch control signal $P_f$ is a binary "1", are frequency-converted and then recorded in undelayed fashion. Although FIG. 4D represents that the discriminating signal $S_f$, which will be described below as being used as a frame discriminating signal, is inserted into the vertical blanking interval of the first field of the odd-numbered frames, that is, the first field of those frames which are not delayed, it will be apparent that, if desired, this discriminating signal $S_f$ can be inserted into the vertical blanking interval of the first field in each of the even-numbered frames.

As shown in FIG. 3, heads 12a and 12b are angularly displaced from each other by an amount equal to $180° - \alpha$. If the angular separation of these heads is equal to 180°, then the beginning of the tracks $T_b$ recorded by head 12b will be displaced, or shifted, from the beginning of the tracks $T_a$ recorded by head 12a by an amount equal to one horizontal line interval in the direction of the track. However, in the SECAM convention, each field is comprised of 312.5 line intervals. Thus, if the horizontal synchronizing intervals in adjacent tracks are to be aligned, the track containing the second field in a frame should be shifted from the track containing the first field in that frame by an amount equal to 0.5 line intervals. This shift is attained by displacing head 12b by the angular amount $\alpha$ from a 180° displacement relative to head 12a. That is, if the heads are angularly displaced from each other by an amount equal to $180° - \alpha$, then, in the recording of each frame, track $T_b$ will be shifted by an amount equal to 0.5 line intervals relative to track $T_a$. Furthermore, and as is preferred for the recording of successive tracks in H-alignment (i.e., with their horizontal synchronizing intervals in alignment), the first track in which the next following frame is recorded is shifted from the preceding track in which the preceding frame is recorded by an amount equal to 1.5 line intervals.

The apparatus illustrated in FIG. 3 also includes a reproducing section which is comprised of a luminance channel for separating and processing the reproduced luminance component, and a chrominance channel which is provided to separate and process the reproduced chrominance component. The luminance channel is comprised of a high pass filter 32, a limiter 34, a frequency demodulator 35 and a de-emphasis circuit 36. High pass filter 32 is connected via a playback amplifier 31 and playback contact P of change-over switch SW₁ to heads 12a and 12b. The high pass filter is adapted to pass the higher frequency band of the FM luminance component and to attenuate the lower frequency band of the frequency-converted chrominance component. Thus, of the reproduced video signals, only the luminance component is supplied through the high pass filter. Limiter 34 is connected to the output of high pass filter 32 and serves to eliminate amplitude fluctuations of the FM luminance component. The output of the limiter is coupled to frequency demodulator 35 which serves to demodulate the FM luminance component back to its original frequency band, and to produce an amplitude-varying luminance signal. The output of frequency demodulator 35 is coupled through de-emphasis circuit 36 to a combining circuit 37. De-emphasis circuit 36 is the complement of pre-emphasis circuit 18 and functions in conventional manner. Thus, combining circuit 37, which may comprise a summing circuit, is provided with a substantially original version of the luminance component.

The chrominance channel is comprised of a low pass filter 33, an ACC circuit 38, a frequency re-converter 39, a selective delay circuit formed of a delay circuit 40 and a switching circuit 41, and a bell filter 43. Low pass filter 33 is connected to heads 12a and 12b via the playback contact P of change-over switch SW₁ and playback amplifier 31. The low pass filter is adapted to pass the relatively lower frequency band containing the frequency-converted chrominance component and the inserted discriminating signal, while attenuating the higher frequency band of the FM luminance component. The output of low pass filter 33 is coupled to ACC circuit 38 which is similar to ACC circuit 25 and serves to eliminate undesired amplitude fluctuations in the reproduced frequency-converted chrominance component. The output of ACC circuit 38 is connected to frequency re-converter 39 which is adapted to re-convert the chrominance component substantially back to its original frequency band. Hence, frequency re-converter 39 may include a modulating or heterodyning circuit which is supplied with a re-converting signal for heterodyning both the reproduced frequency-converted chrominance component and the re-converting signal. The lower side band of the heterodyned signals is selected, this lower side band constituting the frequency re-converted chrominance component. As is recognized, frequency re-converter 39 should be compatible with frequency converter 28. One type of frequency re-converter may be as described in copending application Ser. No. 960,839.

The output of frequency re-converter 39 is coupled to the selective delay circuit. More specifically, the selective delay circuit includes a 1H delay circuit 40 which is adapted to impart a time delay equal to one horizontal line interval to the frequency re-converted chrominance component supplied thereto. The selective delay circuit also includes switching circuit 41 which is provided with a fixed input contact a connected directly to the output of frequency re-converter 39 and a fixed input contact b which is connected to the output of 1H delay circuit 40. Switching circuit 41 is schematically illustrated as including a movable output contact c which is selectively engageable with input contacts a and b, depending upon the state of a switch control signal supplied to a control input thereof. The output of switching circuit 41, that is, the output derived at output contact c, is connected to bell filter 43 which is provided with a frequency characteristic that is complementary to the frequency characteristic of reverse bell filter 24. Thus, bell filter 43 is adapted to restore the frequency re-converted chrominance component back to its original frequency characteristic.

The switch control signal which is supplied to switching circuit 41 is the phase-inverted version of the switch control signal $P_f$, described above, and used to control switching circuit 27 in the recording section. Accordingly, switch control signal $P_f$, produced by frequency divider 48, is supplied to the control input of switching circuit 41 via an inverter 42. It is appreciated that, for the proper operation of the reproducing section, the switch control signal which is produced during the reproducing operation must be synchronized with the switch control signal which is produced during the recording operation. This is provided by making sure that the output of frequency divider 48 is at its proper level at the time that the discriminating signal $S_f$ is reproduced. The circuit for controlling frequency divider 48 accordingly is comprised of gating circuit 52, a tuned amplifier 53, a detector 54 and a wave shaper 55. Gating circuit 52 has been described hereinabove with respect to the recording section of the illustrated apparatus. During the reproducing operation, the input of this gating circuit is connected to low pass filter 33 via the playback contact P of change-over switch SW₃, and the output of this gating circuit is connected to tuned amplifier 53 via the playback contact P of change-over switch SW₄. Tuned amplifier 53 is adapted to amplify a signal having a frequency equal to the frequency to which the amplifier is tuned. In the illustrated apparatus, tuned amplifier 53 is adapted to amplify the discriminating signal $S_f$ whose frequency corresponds to the tuned frequency of the tuned amplifier. The output of tuned amplifier 53 is coupled to detector 54 which, in turn, is coupled to wave shaper 55. The detector serves to detect the amplified discriminating signal $S_f$ supplied thereto by tuned amplifier 53 and to produce an output pulse when this discriminating signal is so detected. Wave shaper 55 is adapted to shape the output pulse produced by detector 54 to a desired pulse waveform. The output of wave shaper 55 is coupled to frequency divider 48. If the frequency divider is a triggerable flip-flop circuit, as suggested above, then the shaped pulse provided by wave shaper 55 is adapted to set the triggerable flip-flop circuit to a predetermined state, such as to "force-set" the flip-flop circuit. Hence, if the output $P_f$ of frequency divider 48 is a binary "0" at the time that the reproduced discriminating signal $S_f$ is detected, frequency divider 48 will be "forced-set" so as to change the state of the output $P_f$ to a binary "1". Conversely, if the output $P_f$ is a binary "1" when the reproduced discriminating signal is detected, the shaped pulse produced by wave shaper 55 will not affect this output.

Gating circuit 52 is supplied with the gate pulse $P_g$ produced by monostable multivibrator 50, described above. However, during the reproducing operation, change-over switch SW₂ does not coupled the output of frequency divider 48 to monostable multivibrator 49. Rather, the playback contact P of this change-over switch couples the rectangular pulse signal output $P_{25}$ of flip-flop circuit 47 to monostable multivibrator 49.

In describing the operation of the reproducing section of the illustrated apparatus, it is assumed that heads 12a and 12b which were used to record the video signals in successive tracks, as shown in FIG. 2, also are used to reproduce those recorded signals. It is further assumed that motor 13, magnetic detectors 45a and 45b and flip-flop circuit 47 are used both during the recording operation and during the reproducing operation. Of course, if separate VTR's are used for recording and reproduction, then separate heads will be used for these purposes. Nevertheless, the operation of motor 13, magnetic detectors 45a and 45b and flip-flop circuit 47 in the reproducing VTR will be the same as in the recording VTR, and as described hereinabove with respect to the recording section. It is also recognized that if separate recording and reproducing VTR's are employed, the azimuth angles of the air gaps in heads 12a and 12b for reproduction will be the same as the azimuth angles which are used for recording.

In a reproducing operation, all of change-over switches $SW_1$-$SW_4$ are changed over to their playback P contacts. As motor 13 rotatably drives heads 12a and 12b, the recorded video signals in tracks $T_a$ and $T_b$, as shown in FIG. 2, are reproduced and supplied via the playback contact P of change-over switch $SW_1$ to playback amplifier 31. High pass filter 32 separates the FM luminance component from the reproduced video signals, and the luminance channel functions in a manner known to those of ordinary skill in the art to reproduce the original luminance component. This luminance component is supplied to combining circuit 37.

Low pass filter 33, included in the chrominance channel, separates the chrominance component and inserted discriminating signal to supply these combined signals $(S_s + S_f)$ through ACC circuit 38 to frequency re-converter 39. ACC circuit 38 removes undesired amplitude fluctuations from the reproduced chrominance component $S_s$; and frequency re-converter 39 operates to re-convert the reproduced chrominance component substantially back to its original frequency band. The re-converted chrominance component includes alternating delayed and undelayed frames, the delayed frame exhibiting a 1H delay with respect to the undelayed frame. These alternating frames are supplied directly to input contact a of switching circuit 41, and through 1H delay circuit 40 to input contact b of the switching circuit.

Figure 6A:
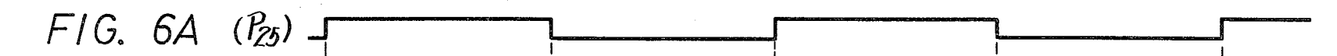
FIGS. 6A–6G are waveform diagrams which are useful in understanding the operation of the reproducing operation carried out by the apparatus shown in FIG. 3.
Figure 6B:
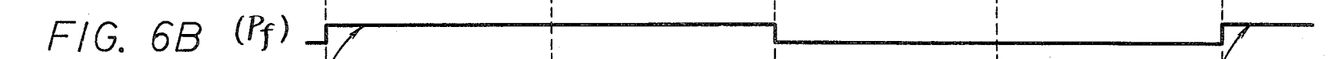
Figure 6C:
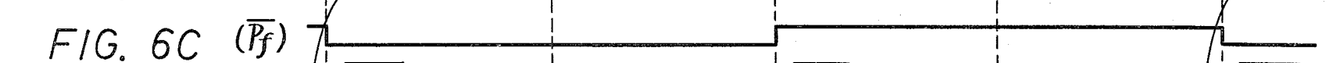

The manner in which switching circuit 41 is controlled now will be described with reference to FIG. 6. The operation of flip-flop circuit 47 in producing rectangular pulse signal $P_{25}$ has been described previously with respect to FIG. 4A. This rectangular pulse signal is shown again in FIG. 6A. The frequency of this rectangular pulse signal is divided in frequency divider 48 to produce output $P_f$; this output being used as the switch control signal for controlling the operation of switching circuit 27 in the recording section. FIG. 4B shows this output, shown again in FIG. 6B, and FIG. 6C shows the phase-inverted version $\overline{P}_f$ of this output. It is appreciated that the phase-inverted version $\overline{P}_f$ is used as the switch control signal for switching circuit 41 in the reproducing section. It is assumed that switching circuit 41 is substantially similar to switching circuit 27 and operates in an analogous manner. Hence, when switch control signal $\overline{P}_f$ is at its binary "1" level, switching circuit 41 operates to couple input contact a to output contact c. Conversely, when switch control pulse $\overline{P}_f$ is at its binary "0" level, the switching circuit operates to couple input contact b to output contact c. As will be described, during reproduction, output $P_f$ is identical to output $P_f$ during recording. That is, output $P_f$ is a binary "1" at each odd frame and is a binary "0" at each even frame. It is recalled that the even frames are subjected to a 1H delay.

Since switching circuit 41 is controlled by the phase-inverted switch control pulse $\overline{P}_f$, the phase-inverted switch control pulse is a binary "0" when each odd-numbered frame is reproduced and is a binary "0" when each even-numbered frame is reproduced. This, of course, is the opposite of the state of the switch control pulse $P_f$ during the recording operation. As a consequence thereof, when inverted switch control pulse $\overline{P}_f$ is a binary "0", the odd-numbered undelayed frame is being reproduced. Switching circuit 41 is controlled by this inverted switch control pulse $\overline{P}_f$ to couple the output of 1H delay circuit 40 to bell filter 43. This means that the reproduced undelayed frame is frequency reconverted and then subjected to a delay equal to one horizontal line interval, that is, equal to the delay imparted to the even-numbered frames during recording, and switching circuit 41 supplies the 1H delayed output of frequency re-converter 39 to bell filter 43. When the even-numbered frames are reproduced from tape 10, inverted switch control pulse $\overline{P}_f$ is a binary "1" to operate switching circuit 41 whereby input contact a is connected to output contact c. Thus, when the even-numbered frames are reproduced, the output of frequency re-converter 39 is connected directly to bell filter 43 without passing through any delay circuit. Since the even-numbered frames had been delayed by one horizontal line interval during the recording operation, these delayed frames are not further delayed during the reproducing operation.

Thus, it is seen that since those reproduced frames which had not been delayed during the recording operation are delayed by one horizontal line interval, while those reproduced frames which had been delayed during the recording operation are not delayed during the reproducing operation, the relative delay between odd-numbered and even-numbered frames which had been imparted during recording is compensated, or eliminated, during reproduction. That is, whereas the even-numbered frames had been delayed during recording, it is the odd-numbered frames (i.e., the originally undelayed frames) that are delayed during reproduction.

Figures 6D, 6E:
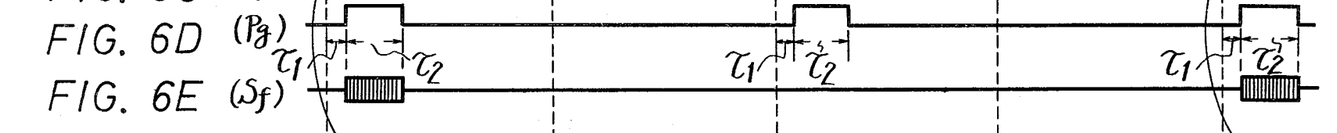

The reproduced frequency-converted chrominance component and inserted discriminating signal $(S_s + S_f)$, shown in FIG. 5E, are supplied through low pass filter 33 and the playback contact P of change-over switch $SW_3$ to gating circuit 52. The purpose of this gating circuit during the reproducing operation is to search for the inserted discriminating signal $S_f$. In this regard, the rectangular pulse signal $P_{25}$ (FIG. 6A) produced by flip-flop circuit 47 and representing the particular track which is reproduced by heads 12a and 12b is supplied through the playback contact P of change-over switch $SW_2$ to monostable multivibrator 49. As in the recording operation, monostable multivibrators 49 and 50 respond to the positive transition in each pulse signal supplied thereto to produce the gating pulse $P_g$ (FIG. 6D) at the output of monostable multivibrator 50. This gating pulse, having the duration $\tau_2$, is supplied to gating circuit 52 to operate (i.e., open) the gating circuit during the selected time intervals established by the gating pulse. During the reproducing operation, it is seen that this gating pulse is produced during the vertical blanking interval VBLK in each frame. This differs from the generation of the gating pulse $P_g$ during the recording operation, wherein the gating pulse is produced during the vertical blanking interval during alternate frames (e.g. the odd-numbered frames) only, as shown in FIG. 4C. Thus, during the reproducing operation, gating circuit 52 is opened during the vertical blanking interval in the first field in each frame.

Figures 6F, 6G:
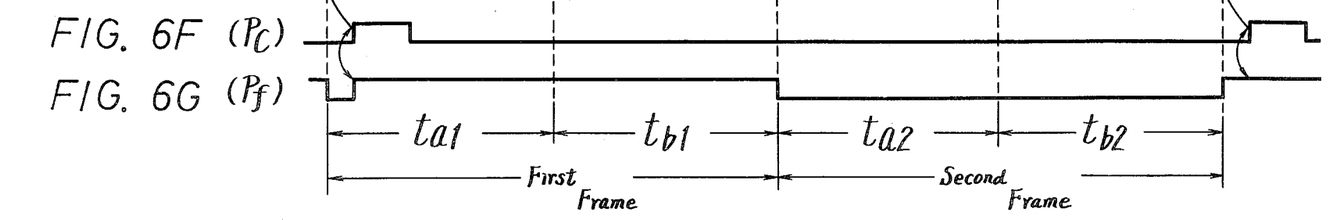

When the discriminating signal $S_f$ is supplied to gating circuit 52, the coincidence of the gating pulse $P_g$ and the discriminating signal results in passing the reproduced discriminating signal from the gating circuit to tuned amplifier 53. The tuned amplifier amplifies this discriminating signal, and the amplified discriminating signal is detected by detector 54. Wave shaper 55 shapes the pulse produced by the detector to supply a correction pulse $P_c$ to frequency divider 48, as shown in FIG. 6F. From a comparison of FIGS. 6B and 6F, it is seen that the correction pulse $P_c$ is produced when output $P_f$ from frequency divider 48 is a binary "1". This corresponds to the gating of the discriminating signal $S_f$ when switch control pulse $P_f$ is a binary "1", as shown in FIGS. 4B and 4D, during the recording operation. In the event that the output $P_f$ of frequency divider 48 during the reproducing operation is a binary "0" at the time that the discriminating signal $S_f$ is reproduced, correction pulse $P_c$ changes the state of output $P_f$, as shown in FIG. 6G. That is, correction pulse $P_c$ is used to "force-set" the triggerable flip-flop circuit which may be provided as frequency divider 48 in the event that this triggerable flip-flop circuit is in its reset state at the time that the discriminating signal $S_f$ is reproduced. Consequently, the output $P_f$ of frequency divider 48 is synchronized during the reproducing operation so as to be identical to the state thereof during the recording operation.

When the output $P_f$ from frequency divider 48 during the reproducing operation is identical to the output $P_f$ during the recording operation, switching circuit 41 is controlled so as to pass the even-numbered frames of the frequency re-converted chrominance component directly to bell filter 43, and to pass the odd-numbered frames of the frequency re-converted chrominance component through 1 H delay circuit 40 to the bell filter. Thus, during the reproducing operation, only those frames which had not been delayed during the recording operation are subjected to a 1H delay. Hence, at the output of bell filter 43, the successive frames are provided in an equalized time relationship with respect to each other.

It is appreciate that if those frames of the chrominance component which had been delayed during the recording operation also are delayed during the reproducing operation, then such frames, at the output of bell filter 43, will exhibit a time delay of two horizontal line intervals relative to the remaining frames. It is for this reason that, in the reproducing operation, the previously delayed frames are not further delayed, while the previously undelayed frames are subjected to a delay which is equal to the delay imparted in the recording section. Thus, and as one example thereof, during the recording operation, the odd-numbered frames of the chrominance component are not delayed, whereas the even-numbered frames of the chrominance component are delayed. In the reproducing operation, the odd-numbered frames of the chrominance component (which had not been delayed) are delayed, while the even-numbered frames of the chrominance component (which had been delayed) are not delayed.

In the foregoing discussion, the discriminating signal $S_f$ is inserted into the first field of the odd-numbered, undelayed frames of the chrominance component during the recording operation. As an alternative thereof, the discriminating signal may be inserted into the first field of the even-numbered, delayed frames. In either embodiment, the discriminating signal serves to represent which frames have been delayed and which frames have not been delayed. Furthermore, although it has been assumed that, during the recording operation, the even-numbered frames had been delayed, it is recognized that, if desired, the odd-numbered frames can be delayed while the even-numbered frames will not be delayed. In the present invention, alternate frame intervals of the chrominance component are delayed.

Figure 7A:
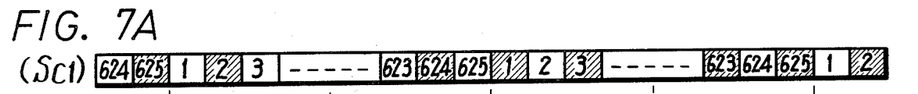
FIGS. 7A–7E are timing diagrams which are useful in understanding the overall operation of this invention.
Figure 7B:
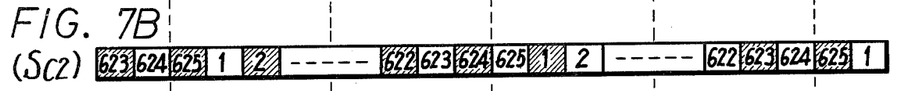
Figure 7C:
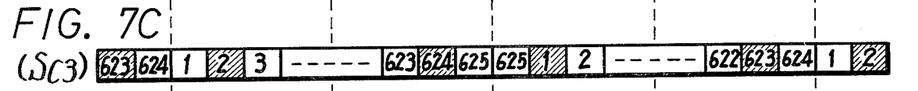

Referring to FIGS. 7A-7E, timing diagrams are illustrated therein which represent the manner in which the present invention operates. FIG. 7A represents the chrominance component $S_{c1}$ produced at the output of ACC circuit 25 in the recording section and supplied directly to input contact a of switching circuit 27. FIG. 7B represents the delayed version $S_{c2}$ of this chrominance component. It is seen that the delayed chrominance component is delayed by one horizontal line interval. In these figures, the cross-hatched areas represent those line intervals in which the R-Y red color difference signals are present, and the unhatched areas represent those line intervals in which the B-Y blue color difference signals are present. Switching circuit 27 is operated such that undelayed chrominance component $S_{c1}$ is supplied to frequency converter 28 during odd-numbered frames, and the delayed chrominance component $S_{c2}$ is supplied to the frequency converter during the even-numbered frames. FIG. 7C represents the alternating delayed and undelayed frames of the chrominance component $S_{c3}$ supplied to the frequency converter. These frames are frequency-converted and recorded in successive parallel tracks. It is seen that the first and last line intervals in each recorded frame contain color information signals relating to the same color, e.g., the blue color difference signals. From FIG. 2, it is recognized that this results in color-alignment of the record tracks.

Figure 7D:
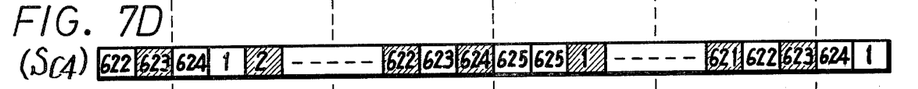
Figure 7E:
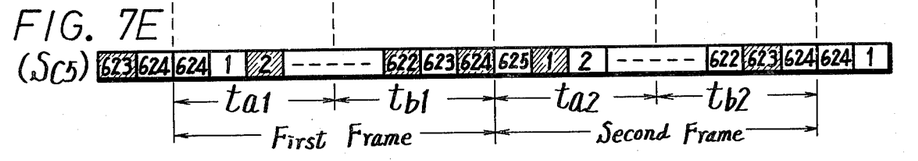

During reproduction, the alternating delayed and undelayed frames, shown in FIG. 7C, are reproduced. These frames of the frequency-converted chrominance component are re-converted by frequency re-converter 39, whose output is shown in FIG. 7C as the chrominance component $S_{c3}$. This reproduced chrominance component $S_{c3}$ is delayed by 1H delay circuit 40 and supplied as the delayed chrominance component $S_{c4}$ to input contact b of switching circuit 41. The undelayed version $S_{c3}$ of this reproduced chrominance component is supplied directly to input contact a of the switching circuit. As discussed above, this switching circuit operates so as to supply the output of 1H delay circuit 40 to bell filter 43, that is, delayed circuit $S_{c4}$, for those frames which had not been delayed during recording. In the illustrated example, this means that the odd-numbered frames, which had not been delayed during the recording operation, are delayed during reproduction and supplied to bell filter 43. The chrominance component $S_{c3}$, which contains delayed even-numbered frames, is supplied by switching circuit 41 to bell filter 43 without further delay. FIG. 7E represents the chrominance component $S_{c5}$ supplied to the bell filter by switching circuit 41. It is recognized that, in the reproducing operation, by delaying the previously undelayed frames of chrominance component and by not delaying the previously delayed frames, successive line intervals from one frame to the next will be substantially in the proper line sequential arrangement. Only the first line interval in each odd-numbered frame, which is equal to delayed line interval 624 of the previous frame, may contain an improper color signal. That is, only this first line interval may appear out of proper color sequence during a normal reproducing operation; however, the remaining line intervals in the odd frames are, of course, in proper color sequence. Hence, this has only negligible effect upon the switching circuits included in the conventional SECAM television receiver.

While the present invention has been particularly shown and described with reference to a preferred embodiment thereof, it should be readily apparent to those of ordinary skill in the art that various changes and modifications in form and details may be made without departing from the spirit and scope of the invention. Some of these changes and modifications have been discussed and suggested above. In addition to these, it is appreciated that, in the recording section, the selective delay circuit comprised of 1H delay circuit 26 and switching circuit 27 may be connected to the output of frequency converter 28. Similarly, in the reproducing section, the selective delay circuit comprised of 1H delay circuit 40 and switching circuit 41 may be connected to the input of frequency re-converter 39. Also, although the delay imparted to the alternate frames by delay circuits 26 and 40 is equal to one horizontal line interval, it is seen from FIG. 2 that color-alignment will be attained during recording if a delay equal to an odd multiple (2n−1) of horizontal line intervals is imparted by these delay circuits. Furthermore, although the embodiment shown in FIG. 3 is operative to delay the frames of the chrominance component, the incoming SECAM video signal may, alternatively, be delayed.

It is intended that the appended claims be interpreted as including all of the foregoing changes, as well as equivalents thereof.

What is claimed is:

1. A method of recording and reproducing in successive parallel tracks on a record medium a periodic information signal having information contained in successive line intervals, a predetermined number of line intervals being included in a field interval and a predetermined number of field intervals being included in a frame interval, said method comprising delaying alternate ones of said frame intervals by a time delay equal to an odd multiple of a line interval; adding an identifying signal to said video signal to identify the delayed and undelayed frame intervals; supplying, in sequence, the delayed and undelayed frame intervals of said periodic information signal together with said identifying signal to a recording transducer for recording in successive parallel tracks on said record medium; reproducing the recorded periodic information signal together with said identifying signal from successive parallel tracks to recover the delayed and undelayed frame intervals alternatively; identifying the delayed and undelayed frame intervals; and delaying the undelayed frame intervals by a time delay equal to said odd multiple of a line interval, thereby recovering said periodic information signal which is undelayed in successive frame intervals relative to each other.

2. The method of claim 1 wherein said time delay in recording and reproducing each is equal to one line interval.

3. The method of claim 1 wherein odd frame intervals are delayed in recording and even frame intervals are delayed in reproducing.

4. The method of claim 1 wherein even frame intervals are delayed in recording and odd frame intervals are delayed in reproducing.

5. The method of claim 1 wherein said periodic information signal is a SECAM composite color television signal; said SECAM composite color television signal being recorded in color alignment, wherein line intervals containing information signals of the same color are aligned transversely of said tracks.

6. The method of claim 5 wherein each track contains a field interval.

7. A method of recording and reproducing in successive parallel tracks on a record medium a SECAM composite color television signal, having information contained in successive line intervals, a predetermined number of line intervals being included in a field interval and a predetermined number of field intervals being included in a frame interval wherein each track contains a field interval and said SECAM composite color television signal is recorded in color alignment such that line intervals containing information signals of the same color are aligned transversely of said tracks; said method comprising delaying the chrominance component of the SECAM television signal in alternate ones of said frame intervals by a time delay equal to an odd multiple of a line interval; frequency converting said chrominance component; supplying the delayed and undelayed frame intervals of the frequency-converted chrominance component of said SECAM television signal to a recording transducer; inserting a discriminating signal into alternate frames of the frequency converted chrominance component; reproducing the recorded SECAM television signal from successive parallel tracks to recover the delayed and undelayed frame intervals alternately; and delaying the undelayed frame intervals by a time delay equal to said odd multiple of a line interval thereby recovering said chrominance component of said SECAM television signal which is undelayed in successive frame intervals relative to each other.

8. The method of claim 7 wherein said step of reproducing includes frequency re-converting the delayed and undelayed chrominance component; detecting the discriminating signal from the reproduced chrominance component; and controlling the delaying of the frequency re-converted chrominance component with the detected discriminating signal such that only the undelayed frequency re-converted chrominance component is delayed.

9. The method of recording at least the chrominance component of a color video signal in successive, parallel tracks, the color video signal being of the type having line sequential alternating color information signals, said method comprising delaying alternate frames of said chrominance component by (2n−1) line intervals, wherein n is an integer; adding an identifying signal to said color video signal to identify the delayed and undelayed alternate frame intervals; frequency converting the chrominance component in said delayed and undelayed frames; and recording the frequency-converted delayed and undelayed chrominance components together with said identifying signal.

10. The method of claim 9 wherein said frequency-converted chrominance component is recorded in color alignment such that color information signals relating to the same color are aligned transversely of said tracks.

11. A method of recording at least the chrominance component of a color video signal in successive, parallel tracks, the color video signal being of the type having line-sequential alternating color information signals, said method comprising delaying alternate frames of said chrominance component by $(2n-1)$ line intervals, wherein n is an integer; frequency converting the chrominance component in said delayed and undelayed frames; inserting a discriminating signal into the vertical blanking interval of a predetermined field of alternate frames of the frequency-converted chrominance component; and recording the frequency-converted delayed and undelayed chrominance components.

12. A method of reproducing the frequency-converted chrominance component of a color video signal from successive, parallel record tracks, the color video signal being of the type having line sequential alternating color information signals and being recorded with alternate frames delayed by $(B\ 2n-1)$ line intervals, wherein n is an integer, such that the frequency-converted chrominance component is in color alignment, said method comprising frequency reconverting the chrominance component; identifying those frames of the frequency reconverted chrominance component which have been recorded with delay; and delaying by $(2n-1)$ line intervals those frames of the re-converted chrominance component which have not been recorded with delay.

13. A method of reproducing the frequency converted chrominance component of a color video signal from successive, parallel record tracks, the color video signal being of the type having line sequential alternating color information signals and being recorded with alternate frames delayed by $(2n-1)$ line intervals, wherein n is an integer, such that the frequency-converted chrominance component is in color alignment, and alternate frames of the recorded frequency-converted chrominance component containing a discriminating signal representing those frames which are recorded with delay; said method comprising frequency reconverting the chrominance component; delay-by $(2n-1)$ line intervals those frames of the re-converted chrominance component which have not been recorded with delay; detecting said discriminating signal; and using the detection of said discriminating signal to avoid further delaying those frames of the re-converted chrominance which have been recorded with delay.

14. Apparatus for recording at least the chrominance component of a composite color television signal in successive parallel record tracks, comprising: delay means for delaying alternate frames of said chrominance component by $(2n-1)$ horizontal line intervals, wherein n is an integer; means for recording the delayed and undelayed frames of the chrominance component alternately and in frequency-converted format and such that the horizontal synchronizing intervals in successive tracks are in alignment; and means for identifying those tracks in which said delayed frames of the chrominance component are recorded.

15. The apparatus of claim 14 wherein said composite color television signal is a SECAM television signal whose chrominance component comprises alternate line intervals of color information signals modulated onto respectively different color subcarriers; and wherein the recorded chrominance component is in color alignment, whereby line intervals containing color information signals relating to a given color are aligned transversely of the tracks.

16. The apparatus of claim 14 further comprising means for reproducing and frequency re-converting the recorded chrominance component; and second delay means for delaying the undelayed frames of said chrominance component by $(2n-1)$ horizontal line intervals.

17. The apparatus of claim 16 wherein said means for reproducing comprises frequency re-converting means supplied with the chrominance component reproduced from said record tracks for frequency re-converting the chrominance component substantially back to its original frequency band; and means for supplying the frequency re-converted chrominance component to said second delay means.

18. The apparatus of claim 17 wherein said second delay means comprises a delay circuit connected to receive the frequency re-converted chrominance component; switch means having one input connected to receive the undelayed chrominance component from the frequency re-converting means, another input connected to said delay circuit to receive the delayed chrominance component therefrom, and an output; and switch control means for controlling said switch means to couple said one input to the output thereof when the delayed frame of said chrominance component is reproduced and to couple said other input to the output thereof when the undelayed frame of said chrominance component is reproduced.

19. Apparatus for recording at least the chrominance component of a composite color television signal in successive parallel record tracks, comprising delay means for delaying alternate frames of said chrominance component by $(2n-1)$ horizontal line intervals, wherein n is an integer; and means for recording the delayed and undelayed frames of the chrominance component alternately and in frequency-converted format and such that the horizontal synchronizing intervals in successive tracks are in alignment, said means for recording including frequency-converting means, transducer means for receiving frequency converted signals from said frequency-converting means and for recording the same in said successive tracks, and means for supplying the delayed and undelayed frames to said frequency-converting means, alternately.

20. The apparatus of claim 19 wherein said delay means comprises a delay circuit connected to receive the chrominance component; and said means for supplying comprises switch means having one input connected to receive the undelayed chrominance component, another input connected to said delay circuit for receiving the delayed chrominance component, an output connected to said frequency-converting means, and switch control means for controlling said switch means to alternately couple said one and other inputs thereof to said output thereof.

21. The apparatus of claim 20 wherein said transducer means comprises at least one rotary transducer; and wherein said switch control means comprises sensing means for sensing when said rotary transducer rotates into position to commence recording a frame of the frequency-converted chrominance component; and pulse producing means responsive to said sensing means for generating a switch control pulse which changes state at each sensing, said switch control pulse being applied to said switch means.

22. The apparatus of claim 21 further comprising means responsive to said switch control pulse for inserting into a predetermined location of alternate frames of the frequency-converted chrominance component a discriminating signal.

23. The apparatus of claim 22 wherein said means for inserting comprises timing means responsive to said switch control pulse for generating an inserting pulse of predetermined duration timed to occur during the vertical synchronizing interval of the first field of each undelayed frame; a source of discriminating signal; and a switching circuit responsive to said inserting pulse for adding said discriminating signal to the undelayed frames of the frequency-converted chrominance component.

24. Apparatus for recording at least the chrominance component of a composite color television signal in successive parallel record tracks and subsequently reproducing said chrominance component from said tracks comprising: delay means for delaying alternate frames of said chrominance component by $(2n-1)$ horizontal line intervals, wherein n is an integer; transducer means for recording the delayed and undelayed frames of the chrominance component alternately and in frequency-converted format and such that the horizontal synchronizing intervals in successive tracks are in alignment, and also for reproducing said recorded chrominance component, including at least one rotary transducer; frequency reconverting means supplied with the chrominance component reproduced from said record tracks for frequency reconverting the chrominance component substantially back to its original frequency band; second delay means for delaying the undelayed frames of said reproduced and frequency re-converted chrominance component by $(2n-1)$ horizontal line intervals, said second delay means including a delay circuit connected to receive the frequency reconverted chrominance component, switch means having one input connected to receive the undelayed chrominance component from the frequency re-converting means, another input connected to said delay circuit to receive the delayed chrominance component therefrom, and an output, and switch control means for controlling said switch means to couple said one input to the output thereof when the delayed frame of said chrominance component is reproduced and to couple said other input to the output thereof when the undelayed frame of said chrominance component is reproduced, wherein said switch control means comprises sensing means for sensing when said transducer rotates into position to commence reproducing a frame of the recorded chrominance component and also comprises pulse producing means responsive to said sensing means for generating a switch control pulse which changes state at each sensing, said switch control pulse being applied to said switch means to operate said switch means as a function of the state of said switch control pulse.

25. The apparatus of claim 24 wherein alternate frames of the recorded chrominance component contain a discriminating signal for representing which of said recorded frames are delayed and which are undelayed; and wherein said switch control means further comprises detecting means for detecting the discriminating signal included in the reproduced chrominance component, and state correcting means for correcting the state of said switch control pulse, if necessary, such that said switch means is operated to couple said one input to the output thereof when the delayed frame of said chrominance component is reproduced.

26. Apparatus for reproducing at least the chrominance component of a composite color television signal which is recorded in successive parallel record tracks on a record medium and wherein alternate frames of the chrominance component are recorded in delayed relation with respect to the remaining frames, the delayed relation being equal to $(2n-1)$ horizontal line intervals, where n is an integer, said apparatus comprising transducer means for scanning said record medium to reproduce the frames of the recorded chrominance component; means for identifying those frames which are recorded in said delayed relation with respect to the remaining frames; and output means coupled to said transducer means for providing time equilization of all he reproduced frames said output means including delay means selectively operable in response to said identifying means to delay the undelayed frames of the reproduced chrominance component by $(2n-1)$ horizontal line intervals.

27. The apparatus of claim 26 further comprising sensing means for sensing when said transducer means commences the reproduction of a frame of said recorded chrominance component; and wherein said delay means comprises a delay circuit connected to receive each frame of the chrominance component, and switch means having one input connected to receive each frame of the chrominance component, another input connected to said delay circuit to receive each delayed frame of the chrominance component, and an output coupled alternately to said one input and then to said other input in response to each sensing by said sensing means.

28. Apparatus for reproducing at least the chrominance component of a composite color television signal which is recorded in successive parallel record tracks on a record medium, wherein alternate frames of the chrominance component are recorded in delayed relation with respect to the remaining frames, the delayed relation being equal to $(2n-1)$ horizontal line intervals, where n is an integer, and wherein the recorded chrominance component includes a discriminating signal recorded in alternate frames to represent which frame of the recorded chrominance component is delayed and which frame is not delayed; said apparatus comprising transducer means for scanning said record medium to reproduce the frames of the recorded chrominance component; sensing means for sensing when said transducer means commences the reproduction of a frame of said recorded chrominance component; and output means coupled to said transducer means for providing time equalization of all the reproduced frames, said output means including delay means selectively operable to delay the undelayed frames of the reproduced chrominance component by $(2n-1)$ horizontal line intervals, wherein said delay means comprises a delay circuit connected to receive each frame of the chrominance component, switch means having one input connected to receive each frame of the chrominance component, another input connected to said delay circuit to receive each delayed frame of the chrominance component, and an output coupled alternately to said one input and then to said other input in response to each sensing by said sensing means, and switch control means responsive to the reproduced discriminating signal for controlling said switch means to couple said one input thereof to said output thereof when the recorded delayed frame is reproduced.

29. The apparatus of claim 28 wherein said switch control means comprises flip-flop means for generating a rectangular pulse signal at a frequency equal to the frame reproduction rate of said transducer means; divider means for dividing the frequency of said rectangular pulse signal to produce a rectangular switch control signal at a frequency equal to one-half said frame reproduction rate, said rectangular switch control signal being applied to said switch means for controlling the operation thereof; and detecting means for detecting the reproduced discriminating signal and to set said divider means such that said rectangular switch control signal is provided with a predetermined level in response to the detected discriminating signal.

30. Apparatus for reproducing at least the chrominance component of a composite color television signal wherein the chrominance component is recorded as a frequency-converted signal in successive parallel record tracks on a record medium and wherein alternate frames of the chrominance component are recorded in delayed relation with respect to the remaining frames, the delayed relation being equal to $(2n-1)$ horizontal line intervals, where n is an integer, said apparatus comprising transducer means for scanning said record medium to reproduce the frames of the recorded chrominance component; sensing means for sensing when said transducer means commences the reproduction of a frame of said recorded chrominance component; and output means coupled to said transducer means for providing time equalization of all the reproduced frames, said output means including delay means selectively operable to delay the undelayed frames of the reproduced chrominance component by $(2n-1)$ horizontal line intervals, wherein said delay means has a delay circuit connected to receive each frame of the chrominance component and switch means having one input connected to receive each frame of the chrominance component, another input connected to said delay circuit to receive each delayed frame of the chrominance component, and an output coupled alternately to said one input and then to said other input in response to each sensing by said sensing means, and further including frequency reconverting means for for reconverting the chrominance component back to its original frequency band, the output of said frequency re-converting means being coupled to said delay circuit and to said one input of said switch means.

31. The apparatus of claim 30 wherein the composite color television signal is a SECAM signal and wherein the chrominance component thereof is recorded in color alignment such that line intervals containing information signals of the same color are aligned transversely of said record tracks.

* * * * *